(12) United States Patent
Valio et al.

(10) Patent No.: US 7,830,950 B2
(45) Date of Patent: Nov. 9, 2010

(54) PROCESSING A SEQUENCE OF SAMPLES OF A SIGNAL USING DOWNSAMPLING

(75) Inventors: Harri Valio, Kämmenniemi (FI); Zhengdi Qin, Tampere (FI)

(73) Assignee: Nokia Corporation, Espoo (FI)

( * ) Notice: Subject to any disclaimer, the term of this patent is extended or adjusted under 35 U.S.C. 154(b) by 903 days.

(21) Appl. No.: 11/600,592

(22) Filed: Nov. 15, 2006

(65) Prior Publication Data

US 2007/0116098 A1 May 24, 2007

(30) Foreign Application Priority Data

Nov. 18, 2005 (WO) ................. PCT/IB2005/003446

(51) Int. Cl.
*H04B 1/00* (2006.01)
(52) U.S. Cl. ...................... 375/147; 375/130
(58) Field of Classification Search ................. 375/147, 375/130
See application file for complete search history.

(56) References Cited

U.S. PATENT DOCUMENTS

| | | | |
|---|---|---|---|
| 6,788,735 B2 * | 9/2004 | Kohli et al. | 375/150 |
| 6,934,322 B2 * | 8/2005 | King et al. | 375/150 |
| 7,463,189 B2 * | 12/2008 | Bryant et al. | 342/357.12 |
| 7,471,717 B2 * | 12/2008 | Huang | 375/150 |
| 7,511,662 B2 * | 3/2009 | Mathews et al. | 342/357.14 |
| 2004/0041728 A1 * | 3/2004 | Bromley et al. | 342/357.12 |
| 2005/0012664 A1 | 1/2005 | Gerein | |
| 2005/0232380 A1 * | 10/2005 | Valio et al. | 375/343 |
| 2006/0071851 A1 * | 4/2006 | Graas et al. | 342/357.14 |
| 2006/0126762 A1 * | 6/2006 | Tapucu et al. | 375/340 |

FOREIGN PATENT DOCUMENTS

| | | |
|---|---|---|
| EP | 1 315 308 | 5/2003 |
| WO | 2004/077692 A1 | 9/2004 |
| WO | 2005/006011 A1 | 1/2005 |
| WO | 2005/006012 A1 | 1/2005 |

OTHER PUBLICATIONS

Zimmer, "Multi-channel GNSS-receiver for BOC-modulated signals conception of combined GALILEO GPS receivers", Navitec 2004 Dec. 8, 2004.*
Zimmer, "Conception on combined GALILEO-GPS Receivers for (E1+E2+L1)-Band", Navitec 2001 Dec. 10, 2001.*
Namgoong, "Minimizing power consumption in direct sequence spread spectrum correlators by resampling IF samples-Part I: performance analysis", IEEE Transactions on Circuits and Systems II: Analog and Digital Signal Processing, vol. 48, Issue 5, May 2001 pp. 450-459.*

(Continued)

*Primary Examiner*—Juan A Torres

(57) ABSTRACT

For processing a sequence of samples of a signal, it is assumed that the signal comprises a carrier that is modulated by a code composed of a sequence of chips. A method of wiping-off an influence by the carrier on the sequence of samples and downsampling the sequence of samples (step 105; step 205; step 301) is shown, as well as utilizing the downsampled sequence of samples as a new sequence of samples for further processing (step 108; step 209; step 302). Also shown are a corresponding processing component 72, a corresponding electronic device 71, a corresponding system, a corresponding software program code and a corresponding software program product.

20 Claims, 16 Drawing Sheets

OTHER PUBLICATIONS

"Neues Konzept für ein GNSS Software Radio Softwaregesteuerter Empfang sämtlicher Navigations-Satelliten-Systeme-Teil 2" by M. Zimmer, Jun. 11, 2002, Elektronik, Weka Fachzeitschriftenverlag, Poing, DE, XP001168124, pp. 74-79.

"Minimizing Power Consumption in Direct Sequence Spread Spectrum Correlators by Resampling IF Samples-Part II: Implementation Issues" by W. Namgoong et al, IEEE Transactions on Circuits and Systems II: Analog and Digital Signal Processing, IEEE Inc. New York, vol. 48, No. 5, May 2001, XP011013438.

European Office Action issued in parallel European Patent Application No. 05850666.8, Jan. 7, 2010 (7 pages).

Marradi et al: "The Galileo Ground Segment Reference Receiver Development: Architecture and Critical Design Issues," ION-2003 Proceedings, [Online], Sep. 12, 2003, pp. 36-65 (30 pages).

Diez et al: "Using the GRANADA Bit-True Simulator to Analyse the Effect of Code Doppler Shift in Galileo E5 and L1 Receivers," ENC GNSS 2005, [Online], Jul. 19-22, 2005 (7 pages).

* cited by examiner

PROCESSING A SEQUENCE OF SAMPLES OF A SIGNAL USING DOWNSAMPLING

FIELD OF THE INVENTION

The invention relates to a method for processing a sequence of samples of a signal, which signal comprises a carrier that is modulated by a spreading code. The invention relates equally to a corresponding processing component, to a corresponding electronic device, to a corresponding system, to a corresponding software program code and to a corresponding software program product.

BACKGROUND OF THE INVENTION

For a spread spectrum communication in its basic form, a data sequence is used by a transmitting unit to modulate a sinusoidal carrier, and then the bandwidth of the resulting signal is spread to a much larger value. For spreading the bandwidth, the single-frequency carrier can be multiplied for example by a high-rate binary pseudo-random noise (PN) code sequence comprising values of −1 and 1, which code sequence is known to a receiver. A PN code period comprises typically 1023 chips, the term chips being used to designate the bits of the code conveyed by the transmitted signal, as opposed to the bits of the data sequence.

Spreading codes are employed for instance, though not exclusively, in Global Navigation Satellite Systems (GNSS).

For the American GNSS GPS (Global Positioning System), for example, more than 20 satellites orbit the earth. Each of the satellites transmits two carrier signals L1 and L2. One of these carrier signals L1 has a frequency of 1575.42 MHz and is employed for carrying a navigation message and code signals of a standard positioning service (SPS). The L1 carrier phase is modulated by each satellite with a different C/A (Coarse Acquisition) code. Thus, different channels are obtained for the transmission by the different satellites. The C/A code is a pseudo-random noise (PN) code, which is spreading the spectrum over a nominal bandwidth of 20.46 MHz. It is repeated every 1023 bits, the epoch of the code being 1 ms. The carrier frequency of the L1 signal is further modulated with the navigation information at a bit rate of 50 bit/s.

A GPS receiver of which the position is to be determined receives the signals transmitted by the currently available satellites, and it detects and tracks the channels used by different satellites based on the different comprised C/A codes. For the acquisition and tracking of a satellite signal, a signal received by a radio frequency (RF) portion of the GPS receiver is first converted into the baseband. Then, the signal is sampled in an analog-to-digital (A/D) conversion, and the samples are correlated with the samples of replica codes that are available for all satellites. The correlation can be performed for example using a matched filter. A correlation value exceeding a threshold value indicates the C/A code and the code phase, which are required for dispreading the signal and thus to regain the navigation information.

While the GPS satellite signals thus comprise a data component, a PN component, and a sinusoidal carrier component, other spread spectrum signals may include an additional sub-carrier modulation.

For the European GNSS GALILEO, for example, four carrier signals E5a, E5b, E6 and L1 have been selected. The basic use of these carrier signals is similar as described for the GPS L1 carrier signal. The spectrum of the sinusoidal carrier signals E6 and L1, however, is spread using a binary offset carrier (BOC) modulation, which is composed of a BOC sub-carrier and a PN-code. This modulation is notated as BOC (n,m), where n denotes the chiprate of the PN-code and m the sub-carrier frequency in 1.023 MHz. The BOC sub-carrier will also be referred to simply as BOC carrier in the following.

To the GALILEO L1 carrier signal, a BOC(1,1) modulation has been assigned. FIG. 1 presents the modulation principle. A first diagram illustrates the progress of the BOC(1,1) carrier over time. The BOC(1,1) carrier consists of subchips having alternating values of +1 and −1, each subchip having a duration of 0.5 ms. A second diagram illustrates the progress of an exemplary PN-code over time. The PN-code consists of a sequence of chips having a value of +1 or −1, each chip having a duration of 1 ms. The beginning of each chip of the PN code coincides with a rising edge of the BOC(1,1) carrier. A third diagram illustrates the BOC(1,1) output signal, which is obtained by mixing the BOC(1,1) carrier with the PN-code, over time.

FIG. 2 is a diagram comparing a spreading of the carrier signal L1 using a GALILEO BOC(1,1) modulation and a GPS C/A code modulation. The diagram shows the amplitude of the spectrum of the modulated carrier in a range of −4 MHz to +4 MHz around the frequency of the carrier signal. It can be seen that with the BOC(1,1) modulation, the signal band is more than doubled compared to the C/A code modulation. With the BOC(1,1) modulation, most of the energy is concentrated in two main lobes on two sides of a single main lobe resulting with the C/A-code modulation. The side lobes resulting with the BOC(1,1) modulation are also strong when compared to those resulting with the C/A-code modulation. The energy distribution of the C/A code modulation and of the BOC(1,1) modulation is shown in the following table:

|  | Main lobe(s) | 1st order lobes | 2nd order lodes |
| --- | --- | --- | --- |
| C/A | 90% | 4.9% (2 × 2.4%) | 1.7% (2 × 0.84%) |
| BOC(1, 1) | 86% (2 × 43%) | 7.1% (2 × 3.6%) | 2.7% (2 × 1.33%) |

A BOC(1,1) signal acquisition can equally be realized by means of a matched filter. To this end, a received RF signal is downconverted and sampled. In order to exploit the signal energy to a large extent and to minimize the overlapping interference, the sampling rate should be sufficiently high to cover the first order side lobes. The minimum sampling rate should be 4 samples per chip (complex), which corresponds to 2 samples per subchip (complex). FIG. 3 is a diagram of a typical matched filter (MF) output resulting with such a BOC (1,1) signal.

It is a disadvantage of the signal acquisition based on a BOC(1,1) signal that the BOC(1,1) modulation doubles the required sampling rate and thus the number of required correlators. The higher sample rate is used throughout the acquisition chain, in order to limit the reduction of accuracy when the signal lies in between the replica code alignments of the correlators. As a result, the hardware complexity will be about four times higher than the hardware complexity for a non-BOC signal.

To the GALILEO E6 carrier signal, a BOC(10,5) modulation has been assigned. A BOC(10,5) modulation is an example of a BOC(n,m) modulation, with n=2m. For this type of BOC modulation, the relation between chips and subchips is the same as for BOC(2,1).

FIG. 4 presents the modulation principle for the representative BOC(2,1) modulation. A first diagram illustrates the progress of the BOC(2,1) carrier over time. The BOC(2,1)

carrier consists of subchips having alternating values of +1 and −1, each subchip having a duration of 0.25 ms. A second diagram illustrates the progress of an exemplary PN-code over time. The PN-code consists of a sequence of chips having a value of +1 or −1, each chip having a duration of 1 ms. The beginning of each chip of the PN code coincides with a rising edge of the BOC(2,1) carrier. A third diagram illustrates the BOC(2,1) modulation over time, which is obtained by mixing the BOC(2,1) carrier with the PN-code.

FIG. 5 is a diagram comparing a spreading of the carrier signal L1 using a GALILEO BOC(2,1) modulation and a GPS C/A code modulation. The diagram shows the amplitude of the spectrum of the modulated carrier signal in a range of −8 MHz to +8 MHz around the frequency of the carrier signal. It can be seen that with the BOC(2,1) modulation, in order to cover the two main lobes of the BOC(2, 1) signal, the minimum bandwidth is ±3 MHz. The minimum usable sampling rate for BOC(2,1) is 4 MHz (complex) and if the first side lobes are also of interest, then a 8 MHz sampling rate should be used. With a sampling rate of 8 MHz, the required acquisition hardware complexity will obviously be even higher than with a sampling rate of 4 MHz.

It is to be understood that a relatively high hardware complexity may be required as well for the processing of other signals comprising a carrier or a sub-carrier that is modulated by a spreading code.

Since a BOC signal is a symmetric signal on both side of the carrier frequency, dual-band receiver structures could be used in order to reduce the bandwidth that is to be processed by the matched filter or by correlators. A corresponding acquisition is illustrated in FIG. 6. The symmetric signal 60 is provided on the one hand to an upper sideband filter 61 and on the other hand to a lower sideband filter 65. The upper sideband filter 61 provides the upper sideband signal to a downconverter 62 for downconversion. The downconverted signal is then provided to a first matched filter or to a first correlator bank 63. The lower sideband filter 65 provides the lower sideband signal to a second downconverter 66 for downconversion. The downconverted signal is then provided to a second matched filter or to a second correlator bank 67. The output of both matched filters or both correlator banks 63, 67 is then added by adder 69 to obtain the final correlation result.

This approach is efficient for a wide spread signal, such as a BOC(5,1) signal, since a narrow baseband signal can be achieved in the sideband filtering for each sideband. For a BOC(1,1) signal, however, for example, the benefit is not significant, since the two sidebands are close to each other, since the filter loss is a concern, and since the overlapping interference could be high in the Doppler environment.

Document EP 1 315 308 A1 presents a signal tracking unit, which utilizes an elimination of the sub-carrier of a BOC modulation, in order to render the tracking of the received radio signal more robust. The elimination is based on a multiplication of the sub-carrier with a replica of the sub-carrier in phase and in quadrature.

Still, the high sample rate prevents an efficient processing.

SUMMARY OF THE INVENTION

The invention enables a more efficient processing of a signal, which comprises a carrier that is modulated by a spreading code.

A method for processing a sequence of samples of a signal is proposed. The signal is assumed to comprise a carrier that is modulated by a code composed of a sequence of chips. The proposed method comprises:

a) wiping-off an influence by the carrier on this sequence of samples and downsampling the sequence of samples; and
b) utilizing the downsampled sequence of samples as a new sequence of samples for further processing.

Moreover, a processing module for processing a sequence of samples of a signal is proposed. The signal is assumed again to comprise a carrier that is modulated by a code composed of a sequence of chips. The proposed processing module comprises a carrier wipe-off and downsampling portion adapted to wipe-off an influence by the carrier on a sequence of samples and to downsample the sequence of samples. The proposed processing module further comprises a processing component adapted to utilize a downsampled sequence of samples provided by the carrier wipe-off and downsampling portion as a new sequence of samples for further processing.

Moreover, an electronic device is proposed, which comprises such a processing module.

Moreover, a system is proposed, which comprises such an electronic device.

Moreover, a software program code for processing a sequence of samples of a signal is proposed. The signal is assumed to comprise a carrier that is modulated by a code composed of a sequence of chips. When being executed by a processing unit, the software program code is adapted to realize the proposed method.

Finally, a software program product is proposed, in which such a software program code is stored, i.e., embodied in a computer readable medium. The software program product can be for instance a separate memory, a memory for integration in an electronic device, a processing unit having a buffer in which the software program code is buffered for execution, etc.

The invention is based on the consideration that a sequence of samples comprising a carrier that is modulated by a spreading code can be processed at a reduced sample rate, once the carrier has been wiped-off. It is therefore proposed that a carrier wipe-off is performed, which is accompanied by a downsampling of the sequence of samples.

It is an advantage of the invention that the reduced sample rate can be used for reducing the processing power of subsequent processing steps. For instance, the power consumption of correlation hardware is roughly halved if the clock rate is halved. Alternatively, the reduced sample rate can be utilized for instance for increasing a time multiplexing of subsequent processing component hardware, implying a reduction of the required hardware and thus of the required silicon area.

The carrier wipe-off and the downsampling can be implemented as consecutive operations or in a single process.

In a first exemplary approach, the sequence of samples may be multiplied with corresponding samples of the known carrier to obtain a carrier wiped-off sequence of samples. This sequence of samples may then be downsampled.

A second exemplary approach is based on the idea that the samples of a signal comprising a modulated carrier show regularities that can be exploited for a simple carrier wipe-off by combining a respective number of subsequent samples in a suitable manner such that the resulting sequence is a new, carrier-free sequence. In this second approach, the samples may be obtained from the signal with a sampling rate, which is at least equal to a frequency of the carrier and at least twice a chiprate of the code. The carrier wipe-off and the downsampling may then be performed in a single processing step by combining respective subsequent samples of a predetermined number of the sequence of samples to obtain a sequence of combined values, namely the downsampled sequence of samples.

In one embodiment of this second approach, a respective combined value lies within a predetermined range or outside of a predetermined range. The proposed method may then further comprise the following step preceding step b). In case a combined value lies within the predetermined range, shifting the sequence of samples by one sample and combining respective subsequent samples of a predetermined number of the shifted sequence of samples to obtain a sequence of combined values. This step takes account of the fact that the combining of samples may result in different sequences of combined values depending on the phase of the available signal that may be more or less qualified for the further processing. It has to be noted that the intermediate step may take effect either after each combination of a number of samples or only after all samples of a sequence of samples have been combined.

If respectively two subsequent samples having values of +1 or −1 are combined, the predetermined range may comprise for example only a single value of zero. That is, only a sequence of combined values is considered that does not comprise any values of zero.

In another embodiment of the second approach, the proposed method comprises a further step of shifting the sequence of samples by one sample and combining respective subsequent samples of a predetermined number of the shifted sequence of samples to obtain a further sequence of combined values. Step b) may comprise in this case utilizing the sequence of combined values and the further sequence of combined values as a respective new sequence of samples for further processing in which an influence by the carrier has been wiped-off. The processed sequence of combined values and the processed further sequence of combined values may then be combined to a single sequence of values. It is to be understood that the combining of samples of the original sequence and of the shifted sequence can be carried out in sequence, for example by the same carrier wipe-off component, or in parallel. It is further to be understood that additional shifts of the original sequence and combining operations can be carried out as well. It is further to be understood that the further processing of both sequences of combined values can be carried out in sequence by the same processing component or in parallel by dedicated processing components. This embodiment has the advantage that the number of values resulting in the further processing can be the same as without a carrier wipe-off, if required.

In both embodiments of the second approach, the combining of respective subsequent samples may comprise for instance combining respective two subsequent samples. It is to be noted, however, that in particular with a higher sampling rate, also more samples could be combined.

If the carrier wipe-off and downscaling is performed by a combining operation, the combining may be adapted suitably to the respective carrier, the respective code, the ratio between the code chiprate and the carrier frequency and the employed sampling rate.

The further processing in step b) may comprise for instance a signal acquisition, including for example a decoding using a matched filter and/or a correlator.

The code may be for example a pseudo-random noise code, and the carrier may be for example a binary offset carrier, like a BOC(n,n) or BOC(2n,n).

The signal may further originate for example from a GNSS signal, which is modulated with the modulated carrier.

If the invention is employed for GALILEO signals, for example, there is the further advantage that after the BOC modulation is wiped-off, most of the PN code properties for GALILEO and GPS become the same. This allows simplifying the receiver structure and reducing the hardware requirements of a combined GPS/GALILEO receiver.

It is to be understood that the proposed processing module and the proposed software program code may be adapted to carry out the steps of any of the presented embodiments.

BRIEF DESCRIPTION OF THE FIGURES

Other objects and features of the present invention will become apparent from the following detailed description considered in conjunction with the accompanying drawings.

DETAILED DESCRIPTION OF THE INVENTION

Figure 7:
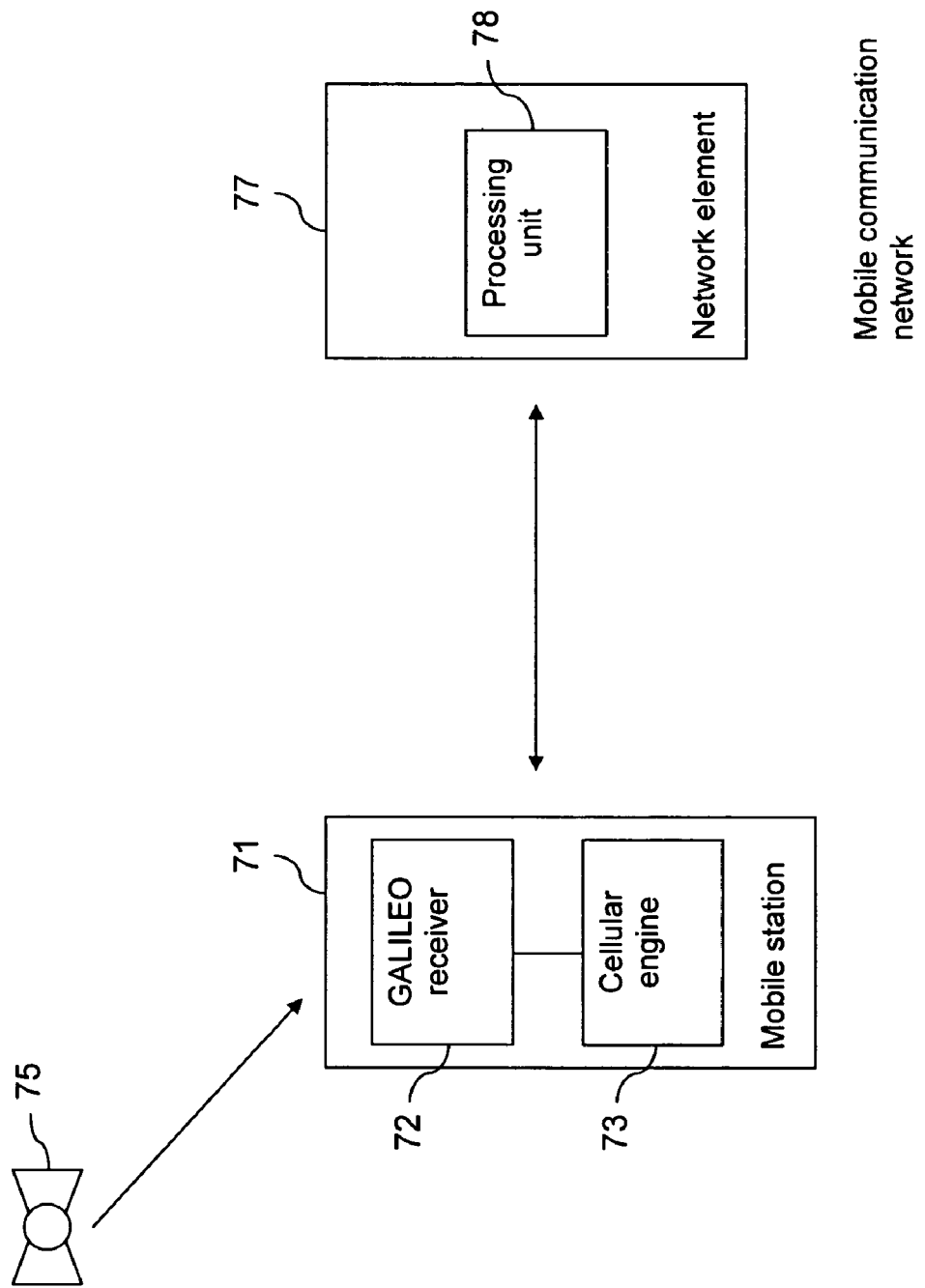
FIG. 7 is a schematic block diagram of a system in accordance with an embodiment of the invention.

FIG. 7 is a schematic block diagram of an exemplary system, which enables a carrier wipe-off and thereby a reduction of the required processing capacities in accordance with an embodiment of the invention.

The system comprises a mobile station 71, GALILEO satellites (SV) 75 and a mobile communication network represented by a network element 77.

The mobile station 71 includes a GALILEO receiver 72 and a cellular engine 73.

Figure 8:
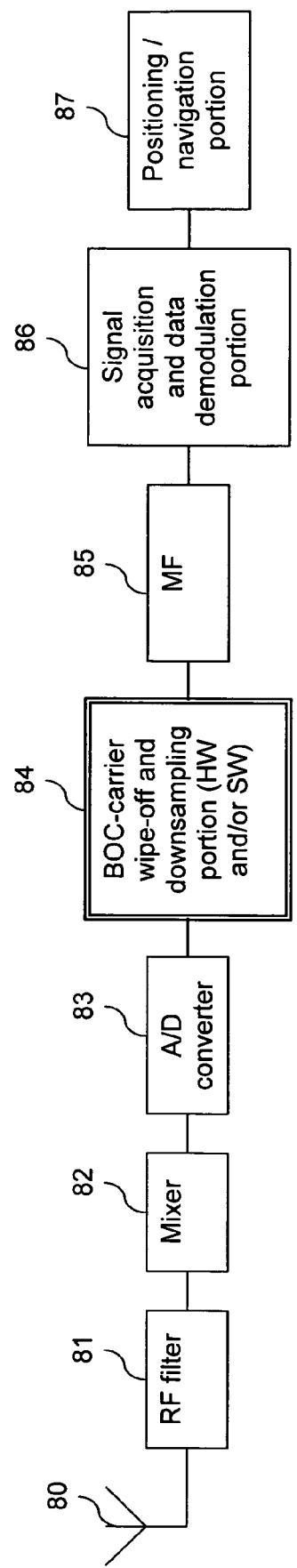
FIG. 8 is a schematic block diagram of a first exemplary embodiment of the GALILEO receiver in the system of FIG. 7.

FIG. 8 presents selected components of the GALILEO receiver 72. The GALILEO receiver 72 comprises an antenna 80, which is connected via an RF filter 81 to a downconversion mixer 82. The downconversion mixer 82 is further connected via an A/D converter 83 to a BOC-carrier wipe-off and downsampling portion 84. The output of the BOC-carrier wipe-off and downsampling portion 84 is connected to a matched filter 85. The output of the matched filter 85 is provided to a signal acquisition and data demodulation unit 86. The signal acquisition and data demodulation unit 86, finally, is connected to some navigation processor 87. It has to be noted that additional processing components may be provided, for example a mixer removing frequency errors due to the Doppler effect, etc. Further, some of the presented components could be realized in a different manner. For example, a correlator bank could be employed instead of the matched filter 85. In general, the GALILEO receiver 72 may correspond to any conventional GALILEO receiver 72, except for the BOC-carrier wipe-off and downsampling portion 84, which is added for realizing an embodiment of the invention. The GALILEO receiver 72 may moreover be realized in hardware and/or in software. For instance, for acquiring and tracking signals received from GALILEO satellites 75, signal measurement tasks, including correlation tasks, could be performed by hardware under control of a software code which is executed by a processing unit of the GALILEO receiver 72.

The cellular engine 73 of the mobile station 71 is a module, which comprises all components required for a conventional mobile communication between the mobile phone 71 and the mobile communication network and which may further be enhanced with additional functions. The cellular engine 73 may comprise for example a data processing unit that is able to perform the navigation processing instead of the GALILEO receiver 72, based on navigation data and measurement results provided by the GALILEO receiver 72. Further, it could be adapted to take care of forwarding navigation data, measurement results or navigation processing results to the mobile communication network for further use.

The network element 77 of the mobile communication network may be any conventional network element 77. It comprises a processing unit 78, which may equally be adapted to perform a navigation processing, based on navigation data and measurement results provided by the GALILEO receiver 72 and forwarded by the cellular engine 73. Alternatively or in addition, the processing unit 78 could be adapted to support the operation of the GALILEO receiver 72 by providing assistance data.

A possible acquisition of GALILEO signals using a BOC (1,1) modulation at the GALILEO receiver 72 of FIGS. 7 and 8 will now be described with reference to the flow chart of FIG. 9.

The GALILEO receiver 72 receives a satellite signal via its antenna 80 (step 101).

The received signal is first filtered by the RF filter 81 in a selected GALILEO frequency band (step 102), for example in a frequency band associated to carrier signal L1.

The filtered signal is then downconverted by the mixer 82 into an intermediate frequency IF (103).

The analog downconverted signal is converted into the digital domain by the A/D converter 83, which samples the analog signal to this end with a sampling rate of 4 MHz (step 104).

The A/D converter 83 outputs the following sequence of samples X:

$$X = \{x_1, x_2, x_3, x_4, x_5, x_6, \ldots\} \quad (1)$$

Figure 10:
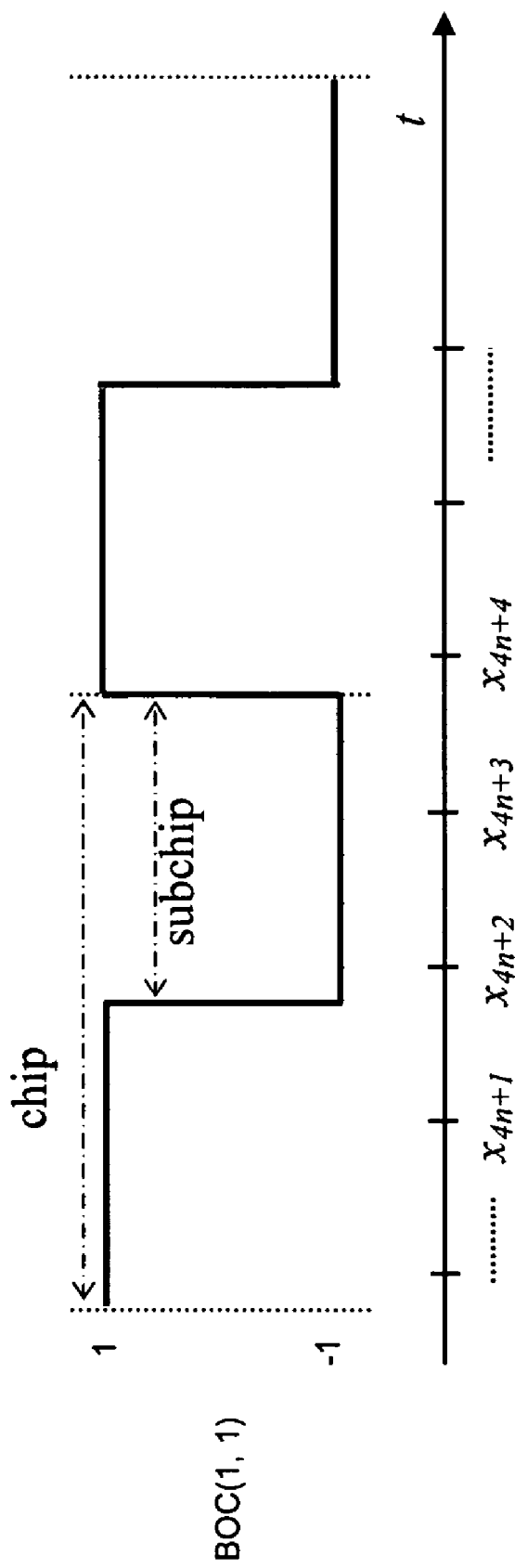
FIG. 10 is a diagram illustrating a sampling of a BOC(1,1) signal.

The sampling is also illustrated in FIG. 10. FIG. 10 is a diagram which shows a BOC(1,1) signal over time. The signal alternates between values of +1 and −1. Chip and subchip duration are indicated. The selected sampling rate of 4 MHz results in four samples per chip or two samples per subchip. Samples $x_{4n+1}$ to $x_{4n+4}$ are indicated.

Next, a BOC-carrier wipe-off is performed by the BOC-carrier wipe-off and downsampling portion 84 (steps 105 to 107).

The BOC-carrier wipe-off is based on the following consideration.

In the BOC(1,1) carrier, the signs of two neighboring samples are either the same or opposite to each other. Further, if two neighboring samples have the same sign, the next two neighboring samples also have the same sign, with the signs being only in an opposite direction. Consequently, also if two neighboring samples in the sequence X have the same sign, the next two neighboring samples have the same sign. Due to the PN code, in this case the signs may or may not be in opposite direction. If two neighboring samples of the BOC (1,1) carrier have different signs, also the next two neighboring samples have different signs, only with a reversed association. If two neighboring samples in the sequence X have different signs, consequently the next two neighboring samples may have different signs as well, possibly with a reversed association.

A first case A is defined to be given, in case the first two neighboring samples of sequence X and the respective next two neighboring samples have the same sign. A second case B is defined to be given, in case any of consecutive two neighboring samples of sequence X, starting with the first two neighboring samples, have different signs.

In addition, if the sequence X is shifted by one sample—either back or forth—, case A and case B switch their position. So, only two possible cases have to be considered.

The samples of the input sequence X can be grouped by taking every four consecutive samples as one group:

$$X = \{[x_1, x_2, x_3, x_4], \ldots, [x_{4n+1}, x_{4n+2}, x_{4n+3}, x_{4n+4}], \ldots\} \, (n=0, 1, 2, 3, \ldots) \quad (2)$$

The demodulation of the BOC(1,1) signal is then performed by applying the following set of equations:

$$Y = \{[y_1, y_2], \ldots, [y_{2n+1}, y_{2n+2}], \ldots\} \quad (3)$$

where $$y_{2n+1} = (x_{4n+1} + x_{4n+2})/2 \ (n=0, 1, 2, 3, \ldots)$$

$$y_{2n+2} = -(x_{4n+3} + x_{4n+4})/2$$

That is, respectively two consecutive samples $x_i$ are combined by adding, and the resulting sum is divided by two. Further, the result is provided alternately with a positive and a negative sign to obtain a sample $y_i$. The resulting samples $y_i$ form a new sequence Y. (step 105)

For the new sequence Y it is checked whether it comprises a sample $y_i$ having a value equal to zero (step 106), which may only occur in the above defined case B situation. If no sample $y_i$ having a value of zero is detected, the new sequence Y is provided immediately for further processing. If a sample $y_i$ having a value of zero is detected, the entire sequence X is shifted one sample back or forth (step 107), in order to obtain a case A situation, and the combining is started anew (step 105). The sequence Y resulting in the new combining is provided for further processing.

The sequence Y that is provided for further processing is a sequence in which the BOC-carrier has been wiped-off. Moreover, the sampling rate is reduced by two to 2 MHz. The output accuracy will nevertheless be guaranteed to be the same as in the original data rate. Equation (3) acts as also a low pass filter. This is important when down-sampling the data in a noisy environment to reduce the noise bandwidth.

Figure 11:
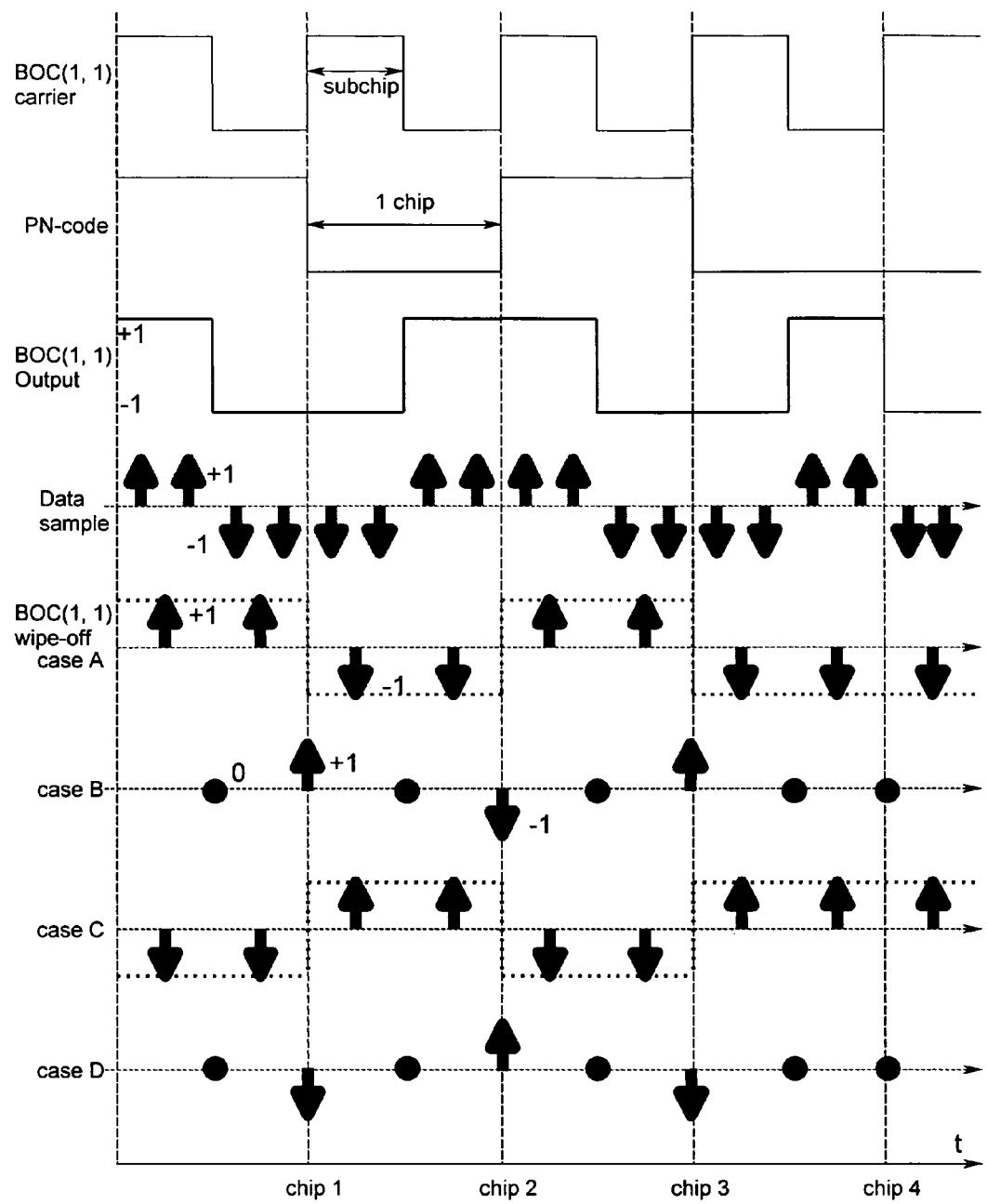
FIG. 11 is a diagram illustrating an exemplary BOC(1,1) carrier wipe-off in the receiver of FIG. 8.

The BOC-carrier wipe-off is illustrated in more detail with an example presented in FIG. 11.

In FIG. 11, a first row presents the BOC(1,1) carrier for a duration of 4 ms.

A second row presents an exemplary PN code having a chip duration which is twice as long as the subchip duration of the BOC(1,1) carrier.

A third row presents the BOC(1,1) signal, that is, the combination of the BOC(1,1) carrier and the PN code. This corresponds to the signal that is provided to the A/D converter 83.

A fourth row presents a sequence X of data samples obtained for this BOC(1,1) signal in the A/D converter 83. As mentioned before, there are two samples per subchip. The presented sequence is {(+1 +1 −1 −1) (−1 −1 +1 +1) (+1 +1 −1 −1) (−1 −1 +1 +1) (−1 −1 . . . }

Equation (3) is applied in step 105 to this sequence X for the BOC-carrier wipe-off. Since there are four samples per chip for the PN code, an arbitrary starting point of the sequence and thus for applying the equation can be the first sample of a chip, the second sample of a chip, the third sample of a chip or the fourth sample of a chip.

These four possible situations are illustrated in rows five to eight of FIG. 11 as cases A, B, C and D, respectively.

It can be seen in FIG. 11 that in case A and case C, all combination results are either +1 or −1. More specifically, the BOC(1,1) carrier is wiped off and the PN code is recovered. There is only a sign difference between case A and case C, which corresponds to a constant phase shift of 180°. Cases A and C can thus be considered as the same case for the PN decoding.

For cases B and D, the combination results comprise also values of zero. If there is no PN coding, all results will be equal to zero. The output is the differential of the PN code.

In step 105 of FIG. 9, the procedure is thus as follows:

In case the BOC-carrier wipe-off starts off with case A or case A', it is noted in step 106 that the combination results do not comprise any value of zero. The resulting sequence Y is thus provided immediately for further use.

In case the BOC-carrier wipe-off starts off with case B or case D, it is noted in step 106 that the combination results comprise a value of zero. The new sequence Y is thus not provided for further use. Instead, the sequence X is shifted by one sample, and the combination processing is started anew with the shifted sequence X.

The new sequence Y resulting with the shifted sequence will be automatically either case A or case C and be provided for further use. It has to be noted that also the first sequence Y resulting in case B could be used for enhancing the signal, but it is neglected in the presented exemplary embodiment.

The new sequence Y can be used for a conventional PN code decoding by means of the matched filter 85 comparing the sequence Y with available replica codes at various phase shifts (step 108).

Due to the reduced sampling rate, the maximum computation power needed is only twice as for the normal PN decoder without BOC modulation.

Once the code phase has been determined by the matched filter operation, the data can be demodulated so that the navigation data be extracted (step 109) and be used for instance in the scope of positioning calculations (step 110).

For example, an application executed by a processing unit of the receiver 72, of the cellular engine 73 or of the network element 77 may determine the time of transmission of the code transmitted by a plurality of satellites 75, in particular based on data in the decoded navigation messages and on counts of epochs and chips of the PN codes. The time of transmission and the measured time of arrival of a signal at the receiver 72 allow determining the time of flight required by the signal to propagate from the respective satellite 75 to the receiver 72. By multiplying this time of flight with the speed of light, it can be converted to the distance, or range, between the receiver 72 and the respective satellite 75. Further, the application may estimate the positions of the satellites 75 at the time of transmission, in particular based on the ephemeris parameters in the decoded navigation messages. The computed distances and the estimated positions of the satellites 75 then permit a calculation of the current position of the receiver 72, since the receiver 72 is located at an intersection of the ranges from a set of satellites 75.

In general, the acquisition of received GALILEO signals may be carried out with any conventional method, except for the BOC-carrier wipe-off steps 105-107, which are added for realizing an embodiment of the invention.

The effect of the Doppler frequency on the presented BOC-carrier wipe-off can be evaluated in simulations. The direct matched filter output may be used to this end as the reference compared to the matched filter output resulting with the presented method. The simulation results for both methods can be compared on the base of the acquisition probability as well the time resolution, that is, the accuracy of the delay estimation. It seems that both methods get the same result if a peak value detection is used for the acquisition. The simulations show that when turning the Doppler shift from zero to $\pm\pi$, the output peaks of both the methods are exactly identical. This means that the Doppler effect is the same for both the methods. However, if a triangle detection is used instead, the presented method is better than the direct MF filter method. More specifically, the triangle property appears to be kept better in a noisy environment if the BOC-carrier is wiped off before applying the matched filter.

The BOC(1,1) modulation that was considered in the above example was based on a PN code chip frequency of 1 MHz. The basic BOC(1,1) modulation actually represents all BOC(n,m) modulations where n=m. That is, the chip and subchip relationship as well as the structure are the same with these modulations as with a BOC(1,1) modulation. The only difference is the basic chip rate. The method presented for a BOC(1,1)-carrier wipe-off can thus be applied directly to any BOC(n,m) signal, where n=m, for example to a BOC(2, 2) signal.

It is further to be understood that a carrier wipe-off in accordance with the invention can be employed for other BOC modulations as well. The grouping of samples and the combination of samples in a respective group only have to be adapted in an appropriate way.

A possible acquisition of GALILEO signals using a BOC (n,m) modulation with n=2m, like a BOC(10,5) modulation, will now be described with reference to the flow chart of FIG. 12. The acquisition can be implemented as well in the GALILEO receiver 72 of FIGS. 7 and 8. The BOC-carrier wipe-off and downsampling portion 84 of FIG. 8 only has to be designed in this case such that it supports a BOC(n,m) modulation with n=2m alternatively or in addition to a BOC(n,m) modulation with n=m, like BOC(1,1).

For a BOC(n,m) modulation with n=2m, the chip and subchip relationship is always the same as for a BOC(2,1) modulation. Thus, only a BOC(2,1) modulation, representative for all possible BOC(n,m) modulations with n=2m, will be considered in the following.

The GALILEO receiver 72 receives a satellite signal via its antenna 80 (step 201).

The received signal is first filtered by the RF filter 81 in a selected GALILEO frequency band (step 202), for example in a frequency band associated to carrier signal E6.

The filtered signal is then downconverted by the mixer 82 into an intermediate frequency IF (203).

The analog downconverted signal is converted into the digital domain by the A/D converter 83, which samples the analog signal to this end (step 204). In order to cover the two main lobes of the BOC(2,1) signal, the minimum bandwidth is ±3 MHz. The minimum usable sampling rate for BOC(2,1)

is 4 MHz (complex) and if the first side lobes are also of interest, then a 8 MHz sampling rate should be used. In the presented example, a 4 MHz sampling rate is selected. It is to be understood, however, that the principle can be extended to other sampling rates as well.

The sampling results again in a sequence:

$$X=\{x_1, x_2, x_3, x_4, x_5, x_6, \ldots\}$$

Next, a BOC-carrier wipe-off is performed by the BOC-carrier wipe-off and downsampling portion 84 (steps 205 to 208).

The BOC-carrier wipe-off is based on the consideration that only two cases A and B have to be considered for the BOC(2,1)-carrier wipe-off as well. The two cases share the same input sampled data sequence but with one sample difference (back or forth) from another. In the input sequence X, respectively two neighboring samples are grouped as follows:

$$X\{[x_1, x_2], \ldots, [x_{2n+1}, x_{2n+2}], \ldots\} \; (n=0, 1, 2, 3, \ldots) \quad (4)$$

In case A, the two samples in all groups of sequence X have different signs. In case B, the samples in some groups of sequence X have the same signs, whenever there is a PN code present.

The BOC-carrier can then be wipe-off by applying the following equation:

$$Y=\{y_1, y_2, y_3, \ldots\}$$

where $$y_n=(x_{2n+1}-x_{2n+2})/2 \; (n=0, 1, 2, 3, \ldots) \quad (5)$$

That is, respectively two consecutive samples are combined by subtraction, and the resulting difference is divided by two. The resulting samples $y_i$ form a new sequence Y. (step 205)

After each combining of two samples $x_i$, $x_{i+1}$ it is checked whether the result is equal to zero (step 206), which is only possible in case B. As long as no result of zero is detected, the combining is continued using the next neighboring samples (steps 207, 205). As soon as a result of zero is detected, however, the entire sequence X is shifted one sample back or forth, in order to obtain a case A situation (step 208), and the combining is started anew from the very beginning (step 205).

The resulting sequence Y of combined values is a sequence in which the BOC-carrier has been wiped-off. Moreover, the sampling rate is reduced by two. The rate of the data flow can now be further down-sampled by two. The output accuracy will nevertheless be guaranteed to be the same as in the original data rate.

Figure 13:
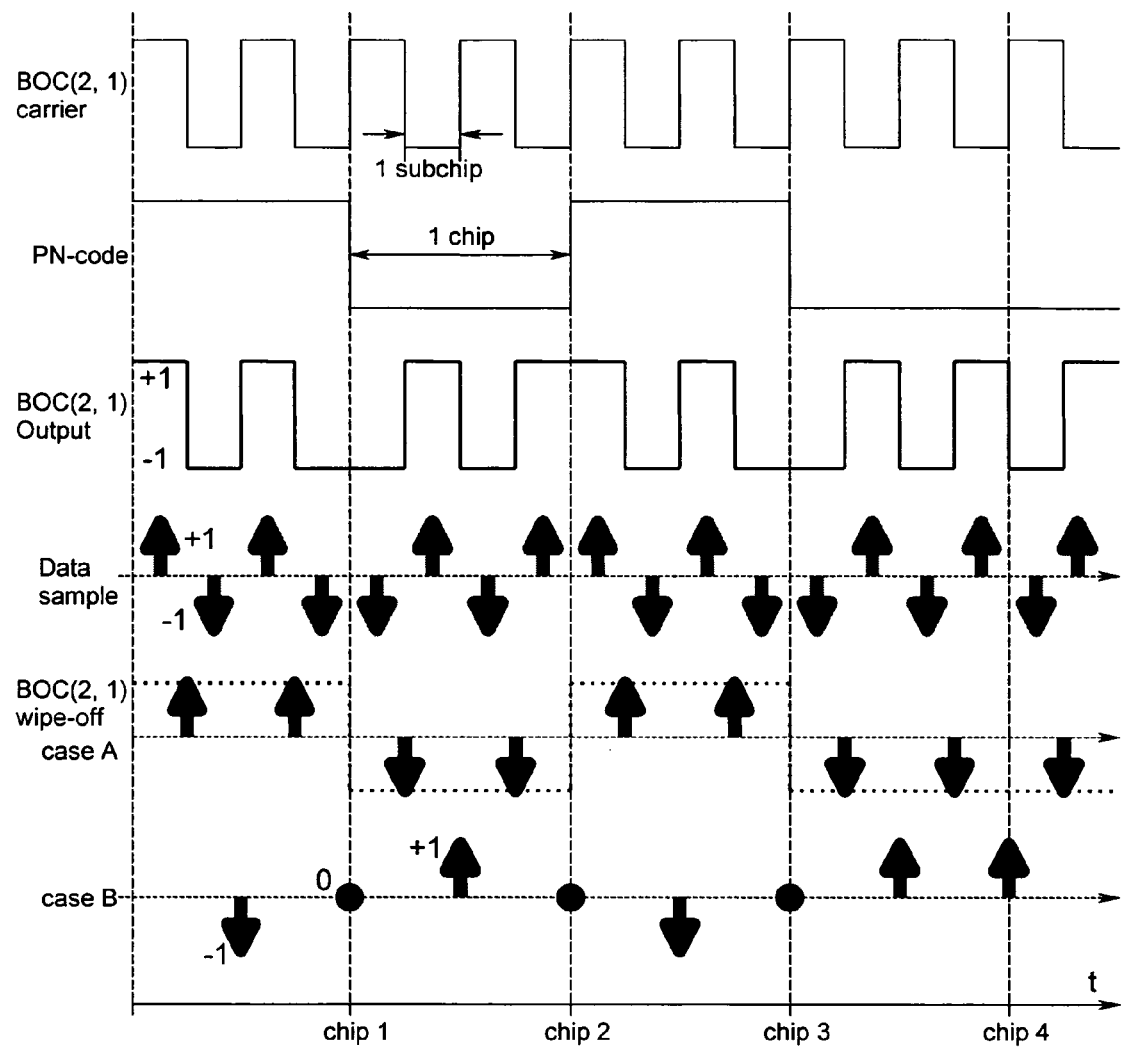
FIG. 13 is a diagram illustrating an exemplary BOC(2,1) carrier wipe-off in the receiver of FIG. 8.

The BOC(2,1)-carrier wipe-off is illustrated in more detail with an example presented in FIG. 13.

In FIG. 13, a first row presents the BOC(2,1) carrier for a duration of 4 ms.

A second row presents an exemplary PN code having a chip duration which is four times as long as the subchip duration of the BOC(2,1) carrier.

A third row presents the BOC(2,1) signal, that is, the combination of the BOC(2,1) carrier and the PN code. This corresponds to the signal that is provided to the A/D converter 83.

A fourth row presents a sequence X of data samples obtained for this BOC(2,1) signal in the A/D converter 83. With the selected sampling rate, there is one sample per subchip. The presented sequence is {(+1 −1 +1 −1) (−1 +1 −1 +1) (+1 −1 +1 −1) (−1 +1 −1 +1) ... }

Equation (5) is applied in step 205 to this sequence X for the BOC(2,1) wipe-off. There are four samples per chip for the PN code, and an arbitrary starting point for applying the equation can be either of the four samples of a chip. However, in this case, the first two samples of a chip will always be the same as the second two samples of a chip. Therefore, it is only necessary to consider the situation that the sequence starts with the first or the second sample of a chip.

These two situations are illustrated in rows five and six of FIG. 13 as cases A and B, respectively.

It can be seen in FIG. 13 that in case A, all combination results are either +1 or −1. More specifically, the BOC(2,1) modulation is wiped off and the PN code is recovered, each chip being represented by two consecutive, equally valued data samples. As indicated above, the rate of the data flow can therefore be further down-sampled by two.

For case B, the combination results comprise also values of zero, in case a PN code is present in the BOC(2,1) signal.

In step 205 of FIG. 12, the procedure is thus as follows:

In case the BOC-carrier wipe-off starts off with case A, the entire sequence is processed (steps 206, 205) and provided as a new sequence Y for further use.

In case the carrier wipe-off starts off with case B, it is noted in step 206 at some point of time—in the present example after the second combination—that the combination result has a value of zero. The combining process is thus interrupted, the sequence X is shifted by one sample (step 208), and the combining process is started anew with the shifted sequence X (step 205).

The result for the shifted sequence will then be case A and be provided as a new sequence Y for further use.

The new sequence Y can be used for a conventional PN code decoding by means of the matched filter 85 comparing the sequence Y with available replica codes at various phase shifts (step 209). Once the code phase has been determined by the matched filter operation, the navigation data can be retrieved (step 210) and be used for instance in the scope of positioning calculations (step 211), for example as mentioned above with reference to steps 109 and 110.

With the BOC wipe-off described with reference to FIGS. 9 and 12, the matched filter outputs only half the number of correlation values compared to a matched filter processing the signal without BOC wipe-off, as the number of input samples is divided by two. In some cases, it may be desired to have the total number of correlation values available, though.

This can be achieved with an alternative implementation of the GALILEO receiver 72 of FIG. 7.

Figure 14:
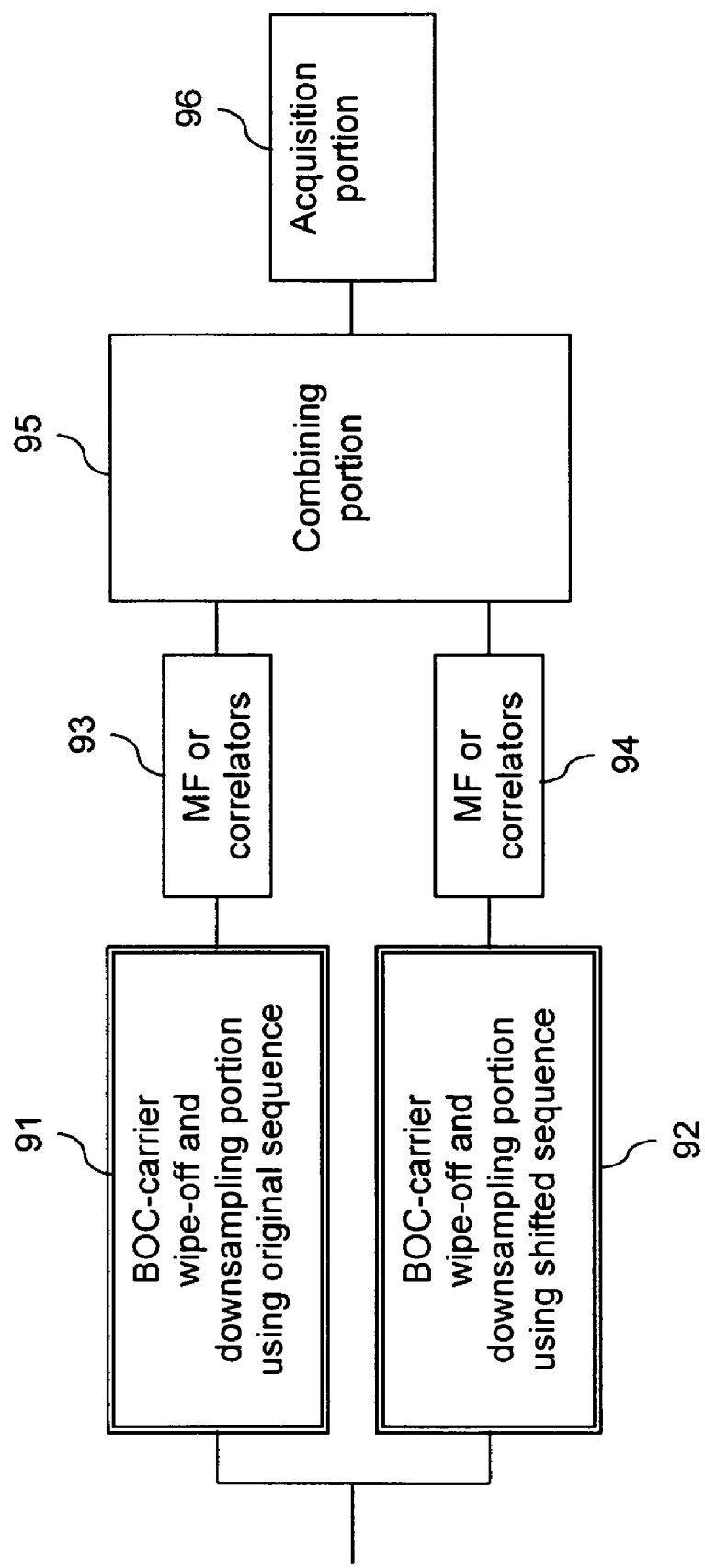
FIG. 14 is a schematic block diagram of components of a second exemplary embodiment of the GALILEO receiver in the system of FIG. 7.

FIG. 14 presents by way of example selected components of such an alternative GALILEO receiver 72. The GALILEO receiver 72 comprises again an antenna, an RF filter, a down-conversion mixer and an A/D converter, which are not depicted. The output of the A/D converter is connected in parallel to a first BOC-carrier wipe-off and downsampling portion 91 and to a second BOC-carrier wipe-off and downsampling portion 92. The output of the first BOC-carrier wipe-off portion 91 is connected via a first matched filter or correlator 93 to a combiner 95. The output of the second BOC-carrier wipe-off and downsampling portion 92 is connected via a second matched filter or correlator 94 to the combiner 95. The output of the combiner 95 is connected to a signal acquisition and data demodulation unit 96. The signal acquisition and data demodulation unit 96 may be connected again to some navigation processor (not shown).

A possible acquisition of GALILEO signals using this alternative implementation will now be described with reference to the flow chart of FIG. 15.

A satellite signal is received, filtered, downconverted and converted into the digital domain as described with reference to FIGS. 9 and 12, resulting again in the following sequence of samples X:

$$X = \{x_1, x_2, x_3, x_4, x_5, x_6, \ldots\}$$

The first BOC-carrier wipe-off and downsampling portion 91 performs a BOC-carrier wipe-off by applying equations (3) or (5) to this sequence of samples X, depending on whether a BOC(n,n) or a BOC(2n,n) modulation was used (step 301). The resulting values are provided to the first matched filter or correlator 93 (step 302).

In addition, the sequence is shifted by one sample (step 303). The second BOC-carrier wipe-off and downsampling portion 92 performs a BOC-carrier wipe-off by applying equations (3) or (5) to this shifted sequence of samples X, depending on whether a BOC(n,n) or a BOC(2n,n) modulation was used (step 304). The resulting values are provided to the second matched filter or correlator 94 (step 305).

The output of the first matched filter or correlator 93 and of the second matched filter or correlator 94 is combined by the combining portion 95 (step 306).

The resulting combined correlation values can then be used in a conventional manner for signal acquisition etc.

Figure 9:
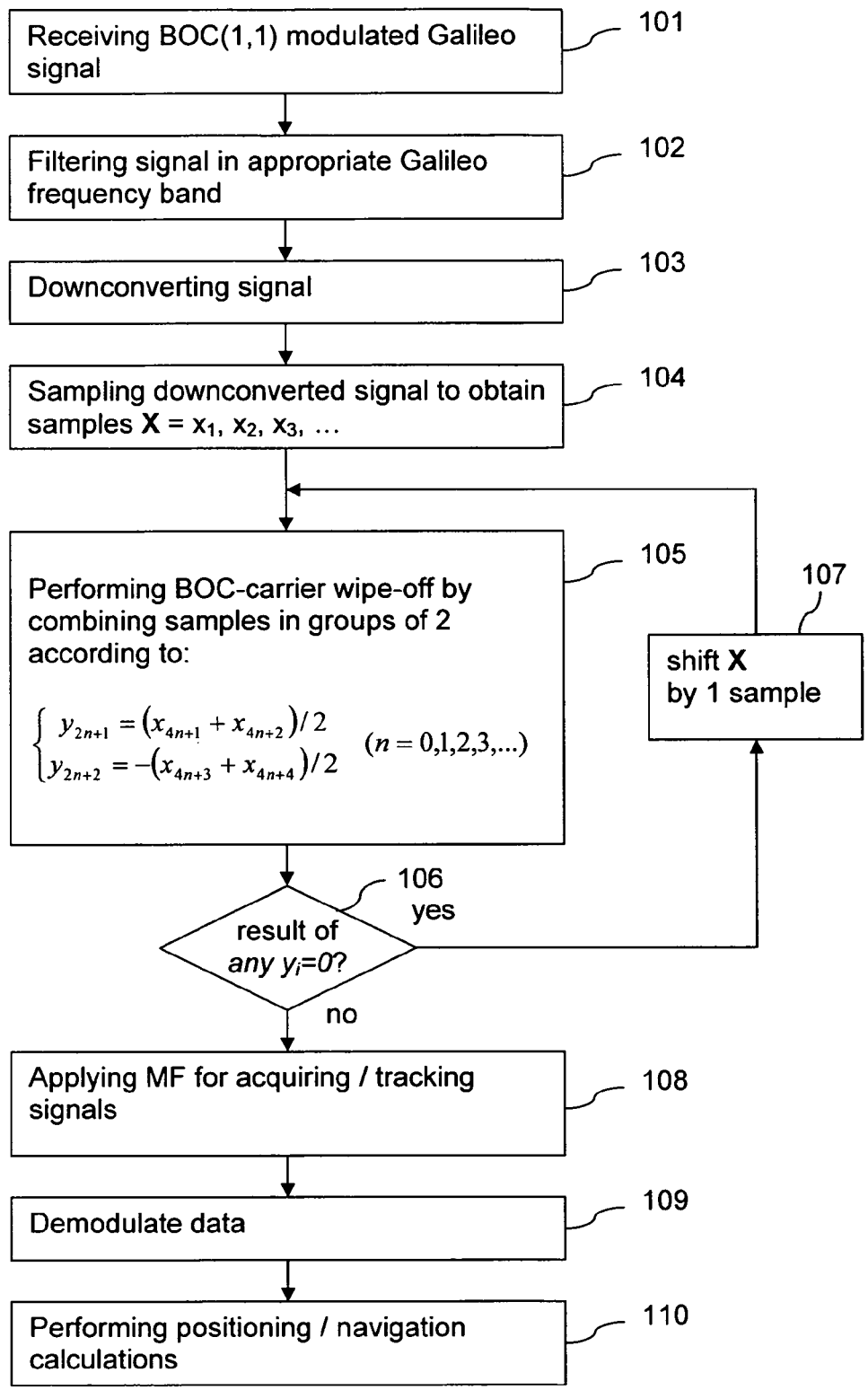
FIG. 9 is a flow chart illustrating an operation in the receiver of FIG. 8.
Figure 12:
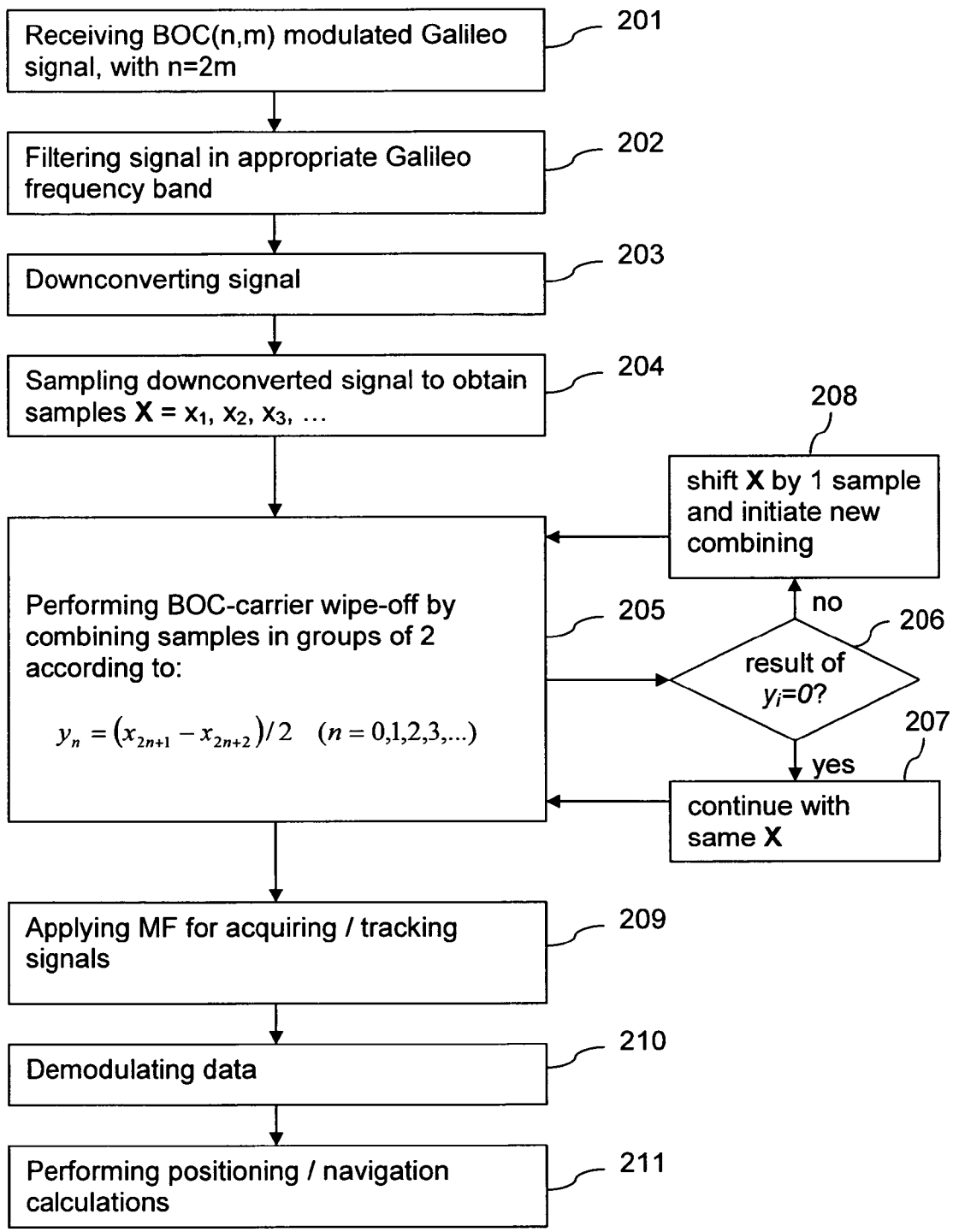
FIG. 12 is a flow chart illustrating a further operation in the receiver of FIG. 8.
Figure 15:
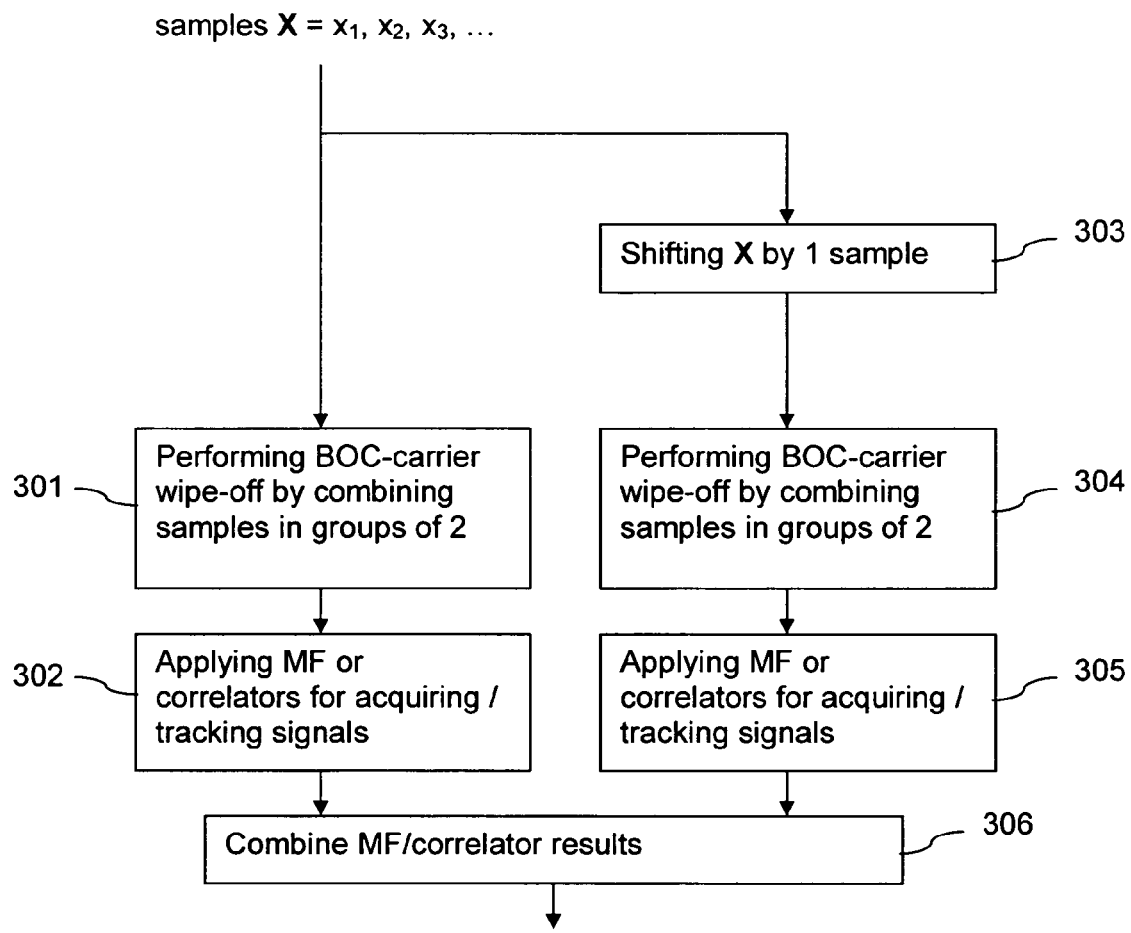
FIG. 15 is a flow chart illustrating an operation in the receiver of FIG. 14.
Figure 16:
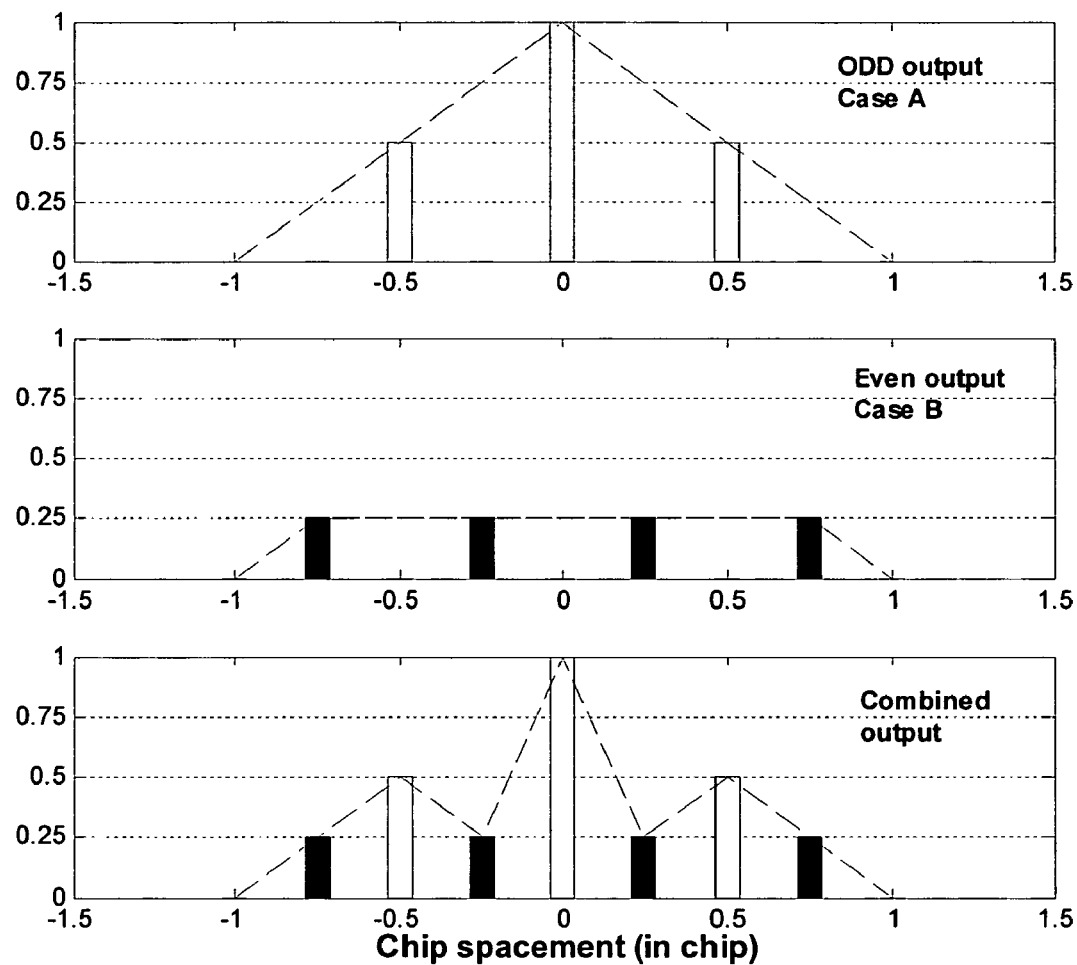
FIGS. 16a, 16b, and 16c show diagrams illustrating a matched filter output resulting in the receiver of FIG. 14.

FIGS. 16*a*-16*c* illustrate the difference between the matched filter output resulting with the approach of FIGS. 9 and 12 on the one hand and the combined matched filter output resulting with the approach of FIG. 15 on the other hand.

FIG. 16*a* shows the familiar triangle, of which the peak indicates the code shift between the PN code and the available replica code in case of a signal without BOC modulation.

This triangle represents as well the matched filter output resulting with the approaches of FIGS. 9 and 12.

Further, FIG. 16*a* represents the output of the matched filter 93 or 94 in the approach of FIG. 15, which takes care of a 'case A' defined above. FIG. 16*b* represents the output of the respective other one of the matched filters or correlators 94 or 93 in the approach of FIG. 15, which takes care of a 'case B' defined above. FIG. 16*c* represents the combined output of the matched filters or correlators 94 and 93, that is, the output of combining portion 95.

Figure 1:
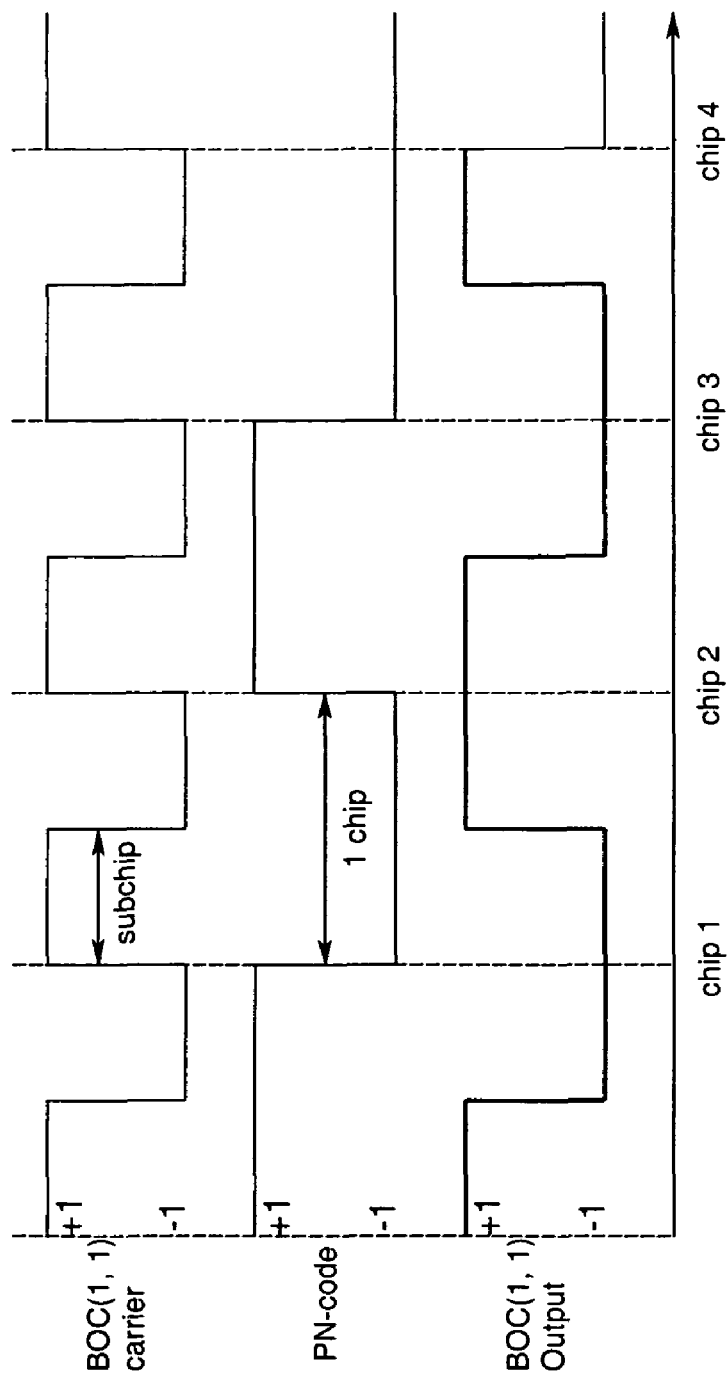
FIG. 1 is a diagram illustrating a BOC(1,1) modulation.
Figure 2:
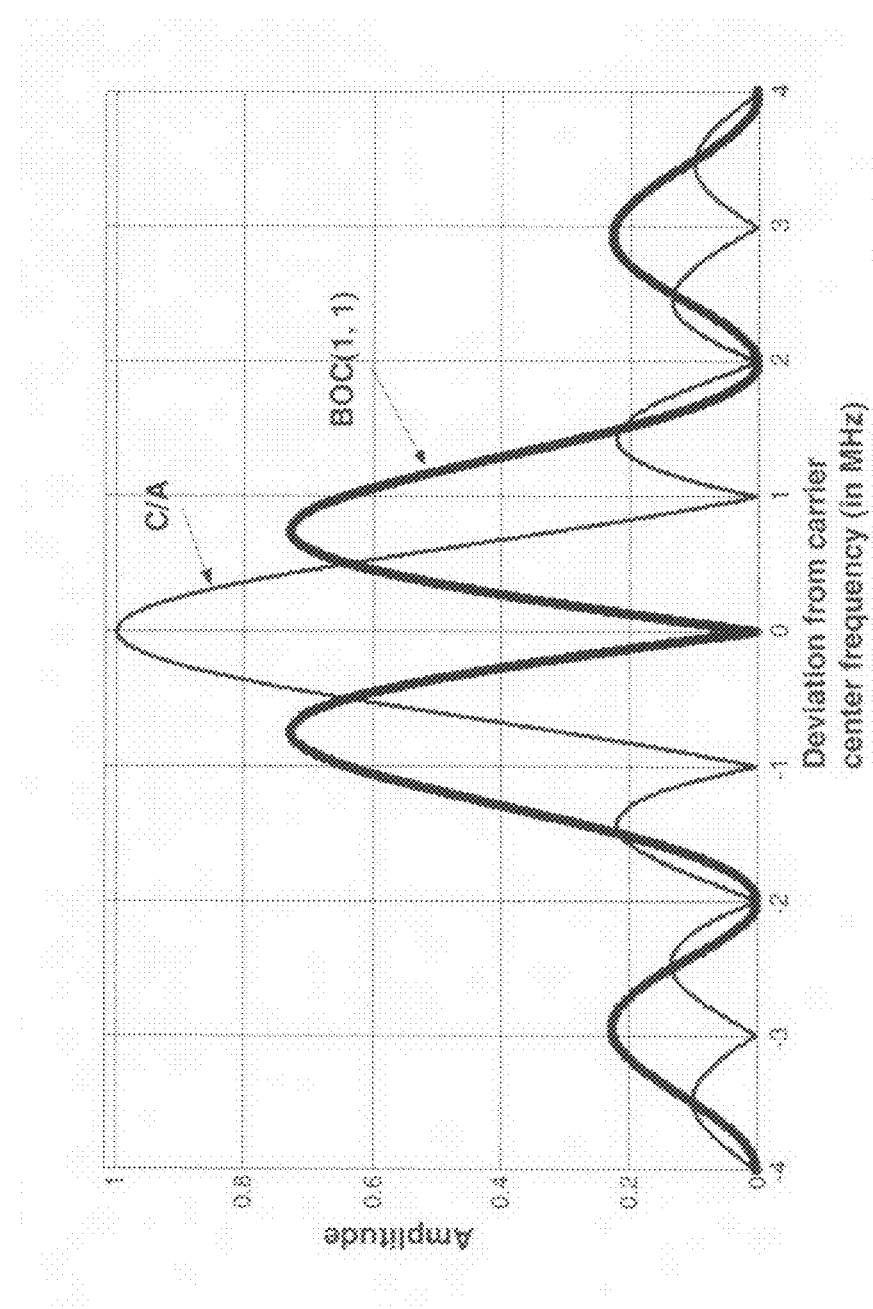
FIG. 2 is a diagram comparing the L1 spectrum resulting with a C/A code modulation and with a BOC(1,1) modulation.
Figure 3:
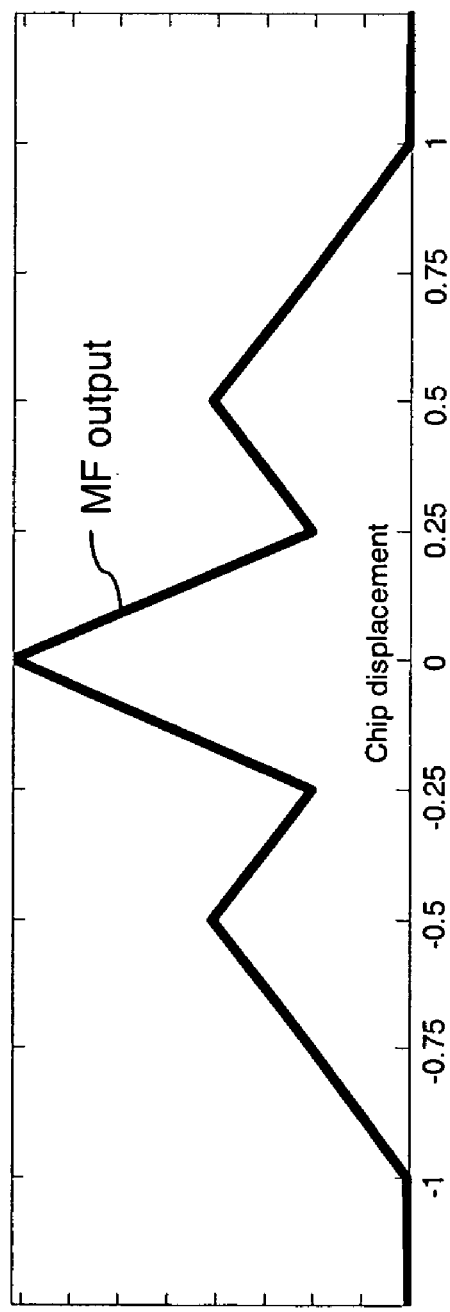
FIG. 3 is a diagram illustrating a matched filter output resulting with a BOC(1,1) signal.
Figure 4:
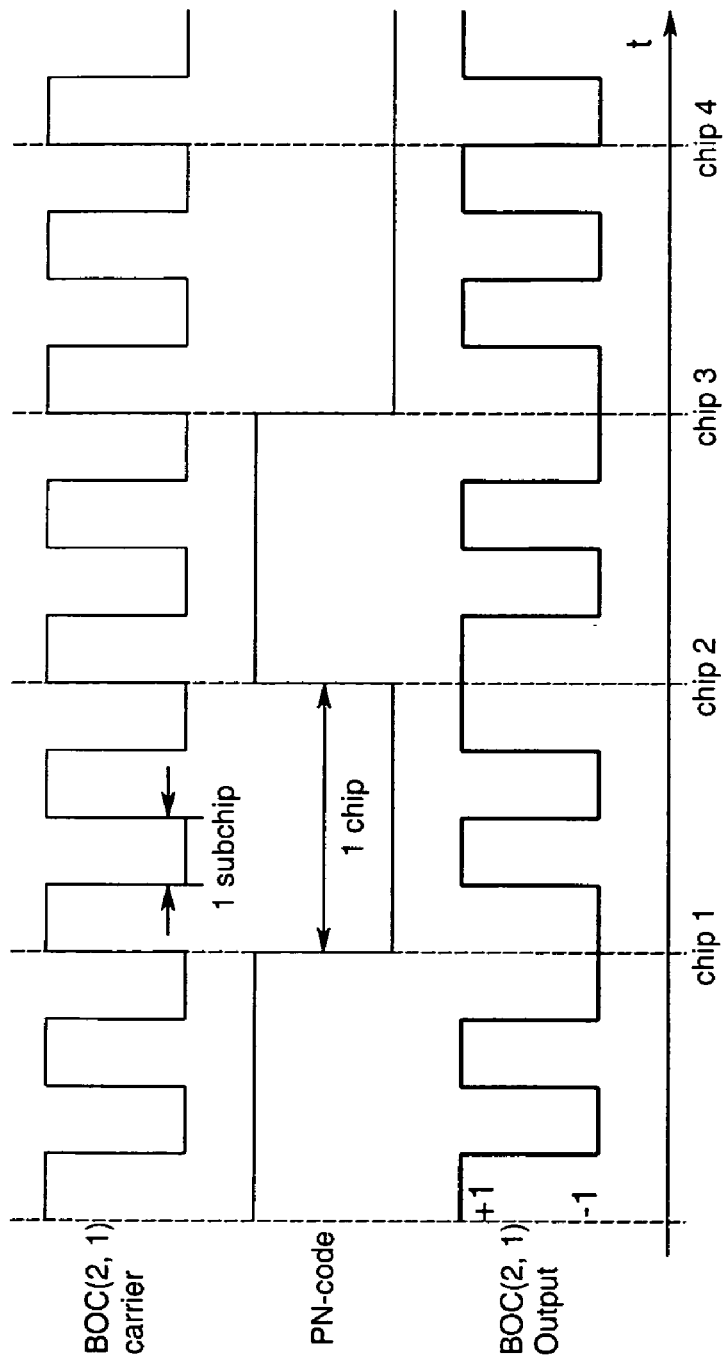
FIG. 4 is a diagram illustrating a BOC(2,1) modulation.
Figure 5:
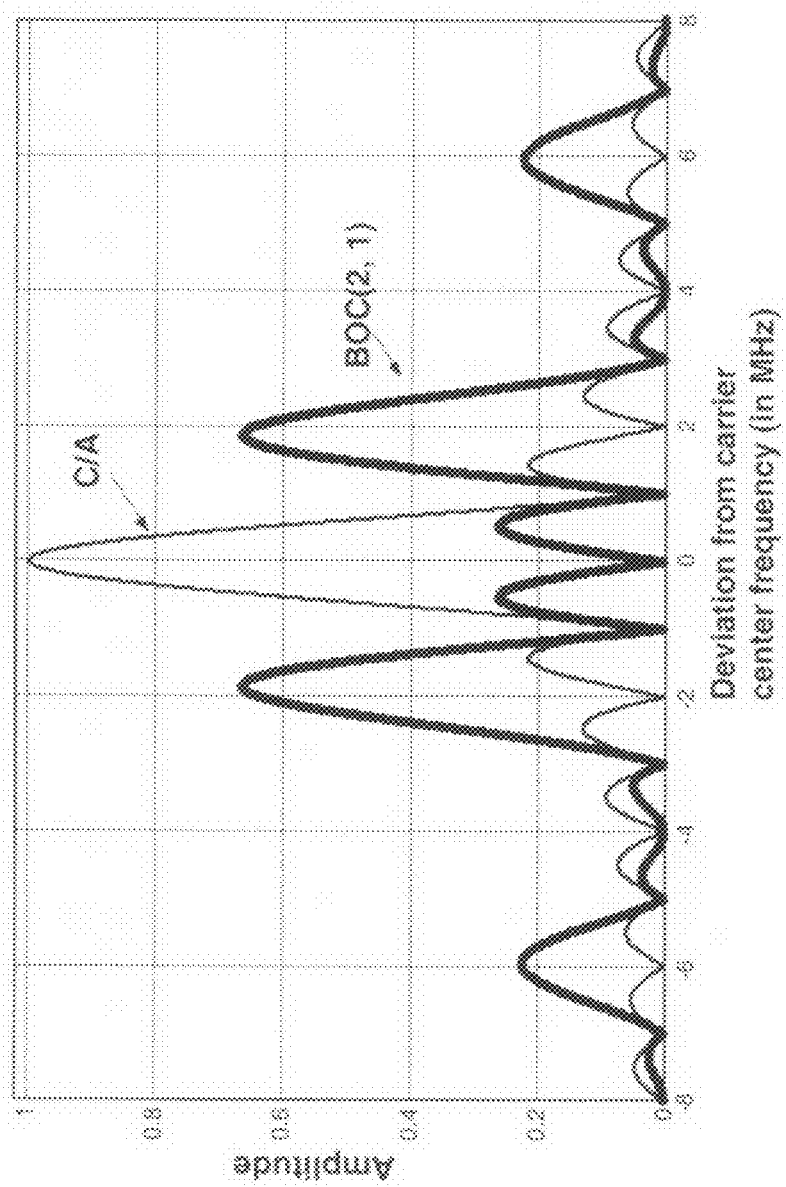
FIG. 5 is a diagram comparing the L1 spectrum resulting with a C/A code modulation and with a BOC(2,1) modulation.
Figure 6:
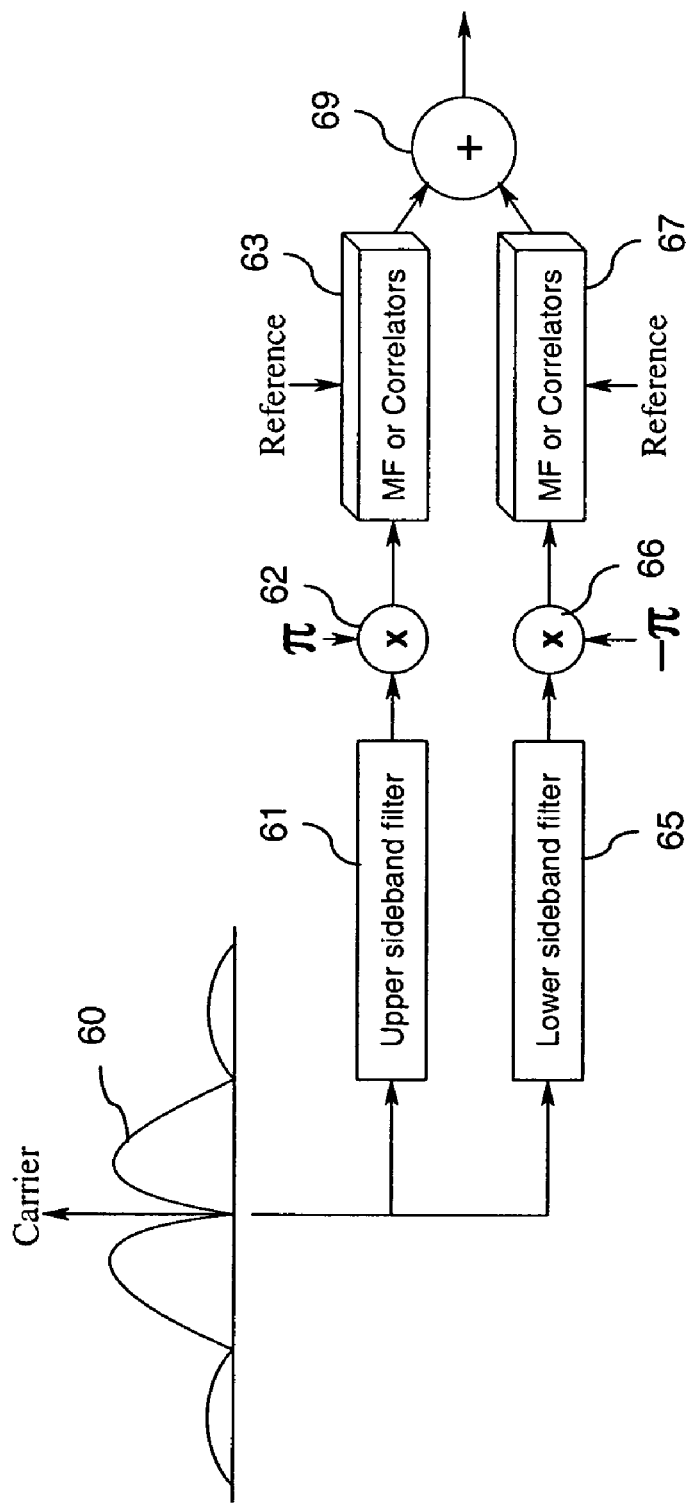
FIG. 6 is a schematic diagram illustrating a signal acquisition using dual-sideband reception.

It can be seen that the combined output corresponds to the conventional N-point matched filter output illustrated in FIG. 3. If the conventional N-point matched filter output illustrated in FIG. 3 is separated into two groups, one by its odd numbers in the output sequence and one by its even numbers, the two resulting N/2-point matched filter outputs actually are equivalent to those represented in FIGS. 16*a* and 16*b*, respectively. They can thus be combined, if necessary, to form the N-point direct MF output as illustrated in FIG. 16*c*.

Finally, the power or silicon area savings that can be achieved with the embodiment of FIG. 14 will be explained by way of an example, in which an incoming BOC(1,1)-modulated signal has a 1 MHz square wave sub-carrier and a spreading code with a length of 4092 chips and a chipping rate of 1 MHz. In a conventional BOC receiver, a sample rate of 4 MHz is used through the whole acquisition chain. This means that a total of 16368 correlators running at 4 MHz is needed to acquire the signal.

In the embodiment of FIG. 14, the BOC carrier is wiped-off and at the same time the sample rate is reduced. This part should run also at a sample rate of 4 MHz. It has to be noted that only two offsets are needed, as it is not necessary to know whether the end result after the correlation multiplications is inverted or not, as this inversion can be removed by taking only an absolute value, i.e. the magnitude, of the resulting complex signal before a non-coherent addition. After the carrier wipe-off, the sample rate is only 2 MHz in the two branches. This means that still a total of 16368 correlators are needed to cover the whole code, namely 2*4092 correlators in both branches, in order not to lose too much signal. These correlators are now running at a sample rate of 2 MHz, though. This lower sample rate can now be utilized either for power savings or, if the higher clock frequency of 4 MHz is still to be used, any hardware employed for the processing after the carrier wipe-off can be time-multiplexed, which means that less hardware is required and that silicon area is saved.

It is to be noted that the described embodiments constitute only some of a variety of possible embodiments of the invention. In particular, the carrier wipe-off can also be implemented for BOC signals that are employed in another system than GALILEO or even for signals using another carrier than a BOC carrier.

The invention claimed is:

1. A method for processing a sequence of samples of a signal, said signal comprises a carrier that is modulated by a code composed of a sequence of chips, said method comprising at a receiver:
   a) wiping-off, by said receiver, an influence by said carrier on said sequence of samples and downsampling said sequence of samples, said wiping-off and downsampling comprising combining respective subsequent samples of a predetermined number of said sequence of samples and exploiting regularities in said sequence of samples in said combining, to obtain a sequence of combined values as a downsampled sequence of samples; and
   b) utilizing said downsampled sequence of samples as a new sequence of samples for further processing.

2. The method according to claim 1, wherein a respective combined value lies within a predetermined range or outside of a predetermined range, said method further comprising the following step preceding step b):
   in case a combined value lies within said predetermined range, shifting said sequence of samples by one sample and combining respective subsequent samples of a predetermined number of said shifted sequence of samples to obtain a sequence of combined values.

3. The method according to claim 1, further comprising shifting said sequence of samples by one sample and combining respective subsequent samples of a predetermined number of said shifted sequence of samples to obtain a further sequence of combined values, wherein b) comprises utilizing said sequence of combined values and said further sequence of combined values as a respective new sequence of samples for further processing in which an influence by said carrier has been wiped-off, and combining said processed sequence of combined values and said processed further sequence of combined values to a single sequence of values.

4. The method according to claim 1, wherein said combining respective subsequent samples comprises combining respective two subsequent samples.

5. The method according to claim 1, wherein said carrier is a binary offset carrier and wherein said code is a pseudo-random noise code.

6. The method according to claim 5, wherein said binary offset carrier is a BOC(n,n), with n being a natural number, wherein said sampling rate is four samples per chip of said pseudo-random noise code, said sequence of samples being denoted by $X = \{x_1, x_2, x_3, x_4, x_5, x_6, \ldots\}$, and wherein said combining is performed by applying the following equation on said sequence of samples:

$$Y = \{[y_1, y_2], \ldots [y_{2n+1}, y_{2n+2}], \ldots\}$$

where, $$y_{2n+1}=(x_{4n+1}+x_{4n+2})/2 \ (n=0,1,2,3,\ldots)$$

$$y_{2n+2}=-(x_{4n+3}+x_{4n+4})/2$$

Y being said sequence of combined values.

7. The method according to claim 5, wherein said binary offset carrier is a BOC(2n,n), with n being a natural number, wherein said sampling rate is four samples per chip of said pseudo-random noise code, said sequence of samples being denoted by $X=\{x_1, x_2, x_3, x_4, x_5, x_6, \ldots\}$, and wherein said combining is performed by applying the following equation on said sequence of samples:

$$Y=\{y_1, y_2, y_3, \ldots\}$$

where, $$y_n=(x_{2n+1}-x_{2n+2})/2 \ (n=0,1,2,3,\ldots)$$

Y being said sequence of combined values.

8. An apparatus for processing a sequence of samples of a signal, said signal comprises a carrier that is modulated by a code composed of a sequence of chips, said apparatus comprising, implemented at least partly in hardware:
   a carrier wipe-off and downsampling portion configured to wipe-off an influence by said carrier on said sequence of samples and to downsample said sequence of samples, wherein said carrier wipe-off and downsampling portion is configured to combine respective subsequent samples of a predetermined number of said sequence of samples and to exploit regularities in said sequence of samples in said combining, to obtain a sequence of combined values as a downsampled sequence of samples; and
   a processing component configured to utilize a downsampled sequence of samples provided by said carrier wipe-off and downsampling portion as a new sequence of samples for further processing.

9. System comprising an apparatus according to claim 8.

10. The apparatus according to claim 8, further comprising an analog-to-digital converter configured to obtain said samples of said signal with a sampling rate, which is at least equal to a frequency of said carrier and at least twice a chiprate of said code.

11. The apparatus according to claim 8, wherein a respective combined value lies within a predetermined range or outside of a predetermined range, and wherein said carrier wipe-off and downsampling portion is configured to shift said sequence of samples by one sample and combining respective subsequent samples of a predetermined number of said shifted sequence of samples to obtain a sequence of combined values, in case a combined value lies within said predetermined range.

12. The apparatus according to claim 11, wherein said predetermined range comprises only a single value of zero.

13. The apparatus according to claim 8, wherein said carrier wipe-off and downsampling portion is configured to shift said sequence of samples by one sample and to combine respective subsequent samples of a predetermined number of said shifted sequence of samples to obtain a further sequence of Combined values, and wherein said processing component is configured to utilize said sequence of combined values and said further sequence of combined values as a respective new sequence of samples for further processing in which an influence by said carrier has been wiped-off, and to combine said processed sequence of combined values and said processed further sequence of combined values to a single sequence of values.

14. The apparatus according to claim 8, wherein said carrier is a binary offset carrier and wherein said code is a pseudo-random noise code.

15. The apparatus according to claim 14, wherein said binary offset carrier is a BOC(n,n), with n being a natural number, wherein said sampling rate is four samples per chip of said pseudo-random noise code, said sequence of samples being denoted by $X=\{x_1, x_2, x_3, x_4, x_5, x_6, \ldots\}$, and wherein said carrier wipe-off and downsampling portion is configured to perform said combining by applying the following equation on said sequence of samples:

$$Y=\{[y_2], \ldots [y_{2n+1}, y_{2n+2}], \ldots\}$$

where, $$y_{2n+1}=(x_{4n+1}+x_{4n+2})/2 \ (n=0,1,2,3,\ldots)$$

$$y_{2n+2}=-(x_{4n+3}+x_{4n+4})/2$$

Y being said sequence of combined values.

16. Apparatus according to claim 14, wherein said binary offset carrier is a BOC(2n,n), with n being a natural number, wherein said sampling rate is four samples per chip of said pseudo-random noise code, said sequence of samples being denoted by $X=\{x_1, x_2, x_3, x_4, x_5, x_6, \ldots\}$, and wherein said carrier wipe-off and downsampling portion is configured to perform said combining by applying the following equation on said sequence of samples:

$$Y=\{y_1, y_2, y_3, y_4, y_5, y_6, \ldots\}$$

where, $$y_n=(x_{2n+1}-x_{2n+2})/2 \ (n=0,1,2,3,\ldots)$$

Y being said sequence of combined values.

17. The apparatus according to claim 8, wherein said processing component is configured to perform a further processing which comprises a decoding, using at least one of a matched filter and a correlator.

18. The apparatus according to claim 8, wherein said signal originates from a Global Navigation Satellite Systems signal, which is modulated with said modulated carrier.

19. The apparatus according to claim 8, wherein said apparatus is one of:
   a module for an electronic device;
   an electronic device;
   a satellite signal receiver;
   a GALILEO receiver; and
   a mobile station.

20. A non-transitory computer readable medium embedded with a software program code for processing a sequence of samples of a signal, said signal comprises a carrier that is modulated by a code composed of a sequence of chips, said software program code being configured realize the following when being executed by a processing unit:
   a) wiping-off an influence by said carrier on said sequence of samples and downsampling said sequence of samples, said wiping-off and downsampling comprising combining respective subsequent samples of a predetermined number of said sequence of samples and exploiting regularities in said sequence of samples in said combining, to obtain a sequence of combined values as a downsampled sequence of samples; and
   b) utilizing said downsampled sequence of samples as a new sequence of samples for further processing.

* * * * *